United States Patent
Blaisdell et al.

(10) Patent No.: US 8,955,142 B2
(45) Date of Patent: Feb. 10, 2015

(54) SECURE EXECUTION OF UNSECURED APPS ON A DEVICE

(75) Inventors: James Blaisdell, Novato, CA (US); Jean-Max Vally, San Francisco, CA (US)

(73) Assignee: Mocana Corporation, San Francisco, CA (US)

( * ) Notice: Subject to any disclaimer, the term of this patent is extended or adjusted under 35 U.S.C. 154(b) by 555 days.

(21) Appl. No.: 13/052,973

(22) Filed: Mar. 21, 2011

(65) Prior Publication Data

US 2012/0246731 A1 Sep. 27, 2012

(51) Int. Cl.
*G06F 17/30* (2006.01)
*G06F 21/54* (2013.01)
*G06F 21/53* (2013.01)
*H04W 12/08* (2009.01)

(52) U.S. Cl.
CPC .............. *G06F 21/53* (2013.01); *G06F 21/54* (2013.01); *H04W 12/08* (2013.01)
USPC ................................................ 726/26; 726/1

(58) Field of Classification Search
CPC ......... G06F 21/53; G06F 21/54; H04W 12/08
USPC ........................... 726/26, 1, 22; 717/168, 174
See application file for complete search history.

(56) References Cited

U.S. PATENT DOCUMENTS

| | | | |
|---|---|---|---|
| 7,130,951 B1 | 10/2006 | Christie et al. | |
| 7,213,237 B2 | 5/2007 | Kobayashi | |
| 7,243,230 B2 | 7/2007 | England et al. | |
| 7,603,551 B2 | 10/2009 | McGrath et al. | |
| 7,669,186 B2 | 2/2010 | Nolan et al. | |
| 7,823,135 B2 | 10/2010 | Horning et al. | |
| 7,877,613 B2 | 1/2011 | Luo | |
| 7,895,580 B1 | 2/2011 | Nikolov | |
| 7,941,700 B2 | 5/2011 | Schlesinger et al. | |
| 8,490,191 B2 | 7/2013 | Kuegler et al. | |

(Continued)

FOREIGN PATENT DOCUMENTS

WO WO 2011057393 * 5/2011

OTHER PUBLICATIONS

Nukona App Center, "Everything You Need to Secure, Deploy and Manage Your Apps on Personal Devices", https://www.nukona.com/products, Jul. 7, 2011.

(Continued)

*Primary Examiner* — Baotran N To
(74) *Attorney, Agent, or Firm* — Beyer Law Group LLP

(57) ABSTRACT

Devices are pre-deployed with an app security mechanism to ensure that apps that are downloaded onto the device do not cause data loss, data leakage, or other harm to the device. A user can start using the device and downloading apps in a conventional or typical manner and be assured that security measures are being taken to minimize potential harm for unsecured and secured apps. An app security enforcement layer or engine operates with, for example, a Type 2 hypervisor on the device, and ensures that any calls by the apps to the operating system of the device are generally safe. Measures such as enhancing or modifying the call, obfuscating the call, or terminating the app may be taken to protect the operating system. These actions are taken based on a policy that may be either interpreted or compiled by the enforcement engine with respect to app execution. The security measures are generally transparent to the user of the device.

15 Claims, 9 Drawing Sheets

(56) References Cited

U.S. PATENT DOCUMENTS

| | | |
|---|---|---|
| 2002/0069263 A1 | 6/2002 | Sears et al. |
| 2006/0120526 A1 | 6/2006 | Boucher et al. |
| 2006/0242406 A1 | 10/2006 | Barde et al. |
| 2007/0050781 A1* | 3/2007 | Furuichi et al. ............... 719/313 |
| 2007/0118558 A1* | 5/2007 | Kahandaliyanage ...... 707/104.1 |
| 2007/0180450 A1 | 8/2007 | Croft et al. |
| 2007/0192864 A1 | 8/2007 | Bryant et al. |
| 2008/0046965 A1* | 2/2008 | Wright et al. ..................... 726/1 |
| 2009/0006868 A1* | 1/2009 | Alkove et al. ................. 713/193 |
| 2009/0007081 A1 | 1/2009 | Lau et al. |
| 2009/0048978 A1 | 2/2009 | Ginter et al. |
| 2009/0292893 A1 | 11/2009 | Henry et al. |
| 2011/0145926 A1* | 6/2011 | Dalcher et al. ................. 726/26 |
| 2011/0246782 A1 | 10/2011 | MacKay et al. |
| 2011/0282995 A1 | 11/2011 | Gass et al. |
| 2011/0283269 A1 | 11/2011 | Gass et al. |
| 2011/0296391 A1 | 12/2011 | Gass et al. |
| 2012/0331550 A1 | 12/2012 | Raj et al. |
| 2013/0091543 A1 | 4/2013 | Wade et al. |

OTHER PUBLICATIONS

Good Technology, Inc., "Taking Secure Steps to Enterprise Mobility—On the Most Popular Devices", http://www.good.com/products, Jul. 7, 2011.

Lookout Mobile Security, https://www.mylookout.com/download, Apr. 2010.

Android Community, "Amazon App Store Lures You in With Free Apps, Makes You Stay if You Want to Keep Them", http://androidcommunity.com/amazon-app-store-lures-you-in-with-free-apps-makes-you-stay-if-you-want-to-keep-them-20110614/?utm_medium=referral&utm_source=pulsenews, pp. 1-2, Jul. 13, 2011.

International Search Report dated May 21, 2012 from International Application No. PCT/US 12/24655.

Written Opinion dated May 21, 2012 from International Application No. PCT/US 12/24655.

U.S. Office Action dated Aug. 30, 2013 from U.S. Appl. No. 13/527,321.

U.S. Office Action dated Oct. 24, 2013 from U.S. Appl. No. 13/309,387.

* cited by examiner

SECURE EXECUTION OF UNSECURED APPS ON A DEVICE

BACKGROUND OF THE INVENTION

1. Field of the Invention

The present invention relates to software and mobile devices. More specifically, it relates to securing, governing, and managing apps on devices, such as handsets, televisions, automobiles, and other emerging smart device categories.

2. Description of the Related Art

As is now known in the computing and mobile handset and smart phone industries, a new computing paradigm is emerging and is being driven by the proliferation of software applications now commonly known as apps for handheld or mobile devices. This proliferation is directly tied to consumer adoption of smart phones and tablets. Enterprises are now creating their own unique apps and distributing them to employees, customers, and partners. Companies are now writing their own apps for their employees and partners to use. However, with this growth another problem is arising, namely, the security and management of these apps on handset devices. Apps can cause significant damage to a handheld device and can cause loss of data or unintended transmission of data. They pose vulnerabilities for the device and a security risk for the user.

Traditional anti-virus approach, such as provided by MyLookOut, does not remove damage done by an app on a handset device. While black listing of apps is partially adequate for protecting devices (not only apps on the list to be downloaded), it would be better if there was a method to contain damage that a malware-infected app has done on a device. It would be preferred if the kernel of the operating system software for the device did not have to be altered. It would also be preferred if the app author did not have to be trained in the art of secure programming, or write anything special or customized for security when writing the app—they should be able to simply continue writing apps as they are currently doing. It would also be preferred if devices were sold or deployed with an app security mechanism integrated into the functionality of the device and that any app security measures taken on the device were transparent to the user.

SUMMARY OF THE INVENTION

In one aspect of the present invention, a device is pre-deployed, or sold, to a consumer with an app security enforcement layer. With this layer, the consumer or user can download unsecured apps—still comprising the majority of apps—and have the app execute on the phone in a secure manner, where potential data loss and other damage to the device, such as a smart phone or tablet computer, is minimized. The enforcement layer or engine is supplied by an app security service provider to the manufacturer of the device who integrates the engine with the functionality (software, firmware, etc.) of the device. In this manner, the operations to make the apps safe on the device are transparent to the consumer. The device manufacturer is able to market the device as more secure for app downloading and execution than other devices.

In another aspect of the invention, a method of securing an app for execution on a device is described. An app is obtained or downloaded onto a device for execution. The device user executes the app. An app security enforcement layer or engine determines whether there is a security policy for the app. If there is not one, a default policy on the device may be used. The policy is applied to the app during execution. Upon application of the security policy to the executing app, security checks are made to any calls made by the app to the device operating system. Based on the security check, one of the following actions may be performed: (a) the call may be allowed to pass to the operating system; (b) the call to the operating system may be enhanced and then passed to the operating system; (c) the call may be blocked; or (d) the app may be terminated and may also be deleted from the device.

BRIEF DESCRIPTION OF THE DRAWINGS

References are made to the accompanying drawings, which form a part of the description and in which are shown, by way of illustration, specific embodiments of the present invention.

DETAILED DESCRIPTION OF THE INVENTION

Figure 1A:
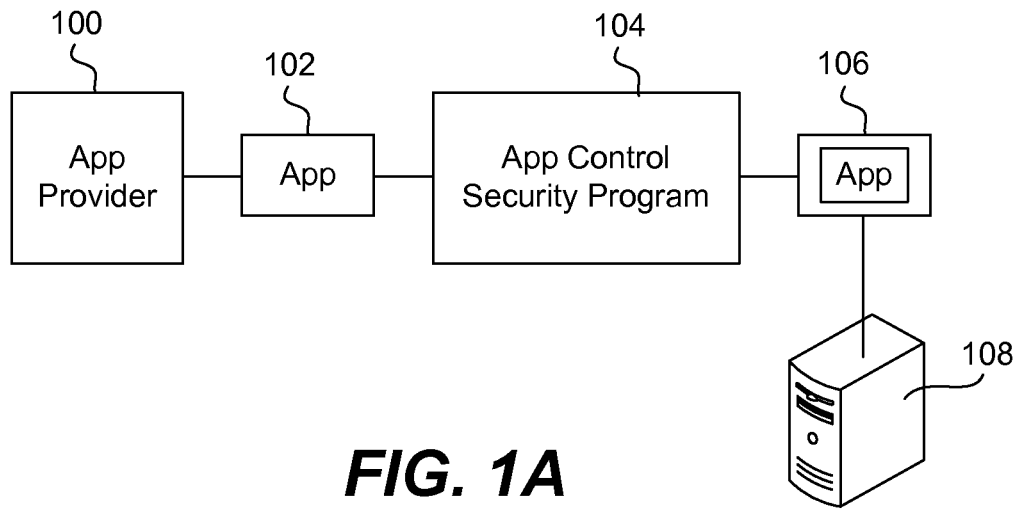
FIG. 1A is a block diagram showing an overview of the app control process of the present invention.

Example embodiments of an application security process and system are described. These examples and embodiments are provided solely to add context and aid in the understanding of the invention. Thus, it will be apparent to one skilled in the art that the present invention may be practiced without some or all of the specific details described herein. In other instances, well-known concepts have not been described in detail in order to avoid unnecessarily obscuring the present invention. Other applications and examples are possible, such that the following examples, illustrations, and contexts should not be taken as definitive or limiting either in scope or setting. Although these embodiments are described in sufficient detail to enable one skilled in the art to practice the invention, these examples, illustrations, and contexts are not limiting, and other embodiments may be used and changes may be made without departing from the spirit and scope of the invention.

Methods and system for preventing device software applications from infecting or otherwise damaging a device, in particular, a mobile device, are described in the various figures. These types of applications, used often on a variety of mobile devices, such as smart phones, tablet computers, gaming devices, and portable computing devices are commonly referred to as "apps." These apps may also be downloaded on to non-mobile devices, such as TVs, computers, automobiles, and other emerging smart device categories. Methods and systems described are not intended to be limited to operation on mobile devices. These device programs or apps have proliferated and are now very prevalent. Currently, apps are typically written in either Java or C. The methods and systems described herein may be applied to apps written in either or to apps written in other languages for different platforms. Most apps, if not all, have to communicate with the mobile device's operating system to get a specific service that the app needs in order to perform its intended function and this service is usually only available from the operating system. A common example of such a service used is GPS to get the location of the device which the app may need. However, because of this exposure, apps are a vulnerability for the device and pose a security and privacy risk for the user. Companies want to be able enforce a centralized policy to control and secure access to its data and software. This is also true for end users (i.e., individuals, home users, and the like). It enables enterprise IT departments to maintain governance of corporate data. The methods described below provide a centralized way to control security with respect to apps that are downloaded onto mobile devices, where the devices are either an employee's personal phone or an employer's phone, so that those apps do not pose a security threat. Various embodiments of the invention may also be used by parents and individuals (i.e., in home or non-work environments) to ensure that their personal mobile devices are safe from malware and may also be used to apply controls, such as on usage. Embodiments of the app control software of the present invention may also be used for mobile device data protection and back-up and for application-level telemetry.

FIG. 1A is a block diagram showing an overview of the app control process of the present invention. It is a generic description of one process without being tied to a specific configuration or environment. An app 102 is provided by app provider 100 which can be any type of entity (individual, software developer, employer, etc.). It is generally unprotected and the only security surrounding it is provided by the operating system. The only shield and checking done on how it executes on the device once loaded is provided by the operating system.

The present invention enables additional security of the apps that is not provided by the device's operating system. A security application program 104 is applied to app 102. Or the app 102 is input to program 104, which may be supplied by a third-party app security provider. In one embodiment, security application program 104 has a policy manager and a policy wrapper which may be in different locations. They are described in greater detail in FIG. 2. Once security program 104 has been applied to app 102, the app is wrapped with a security layer so that the device is protected. It is shown as secured app 106. In one embodiment, secured app 106 is then downloaded onto a mobile device 108, such as a smart phone or tablet computer, where it executes securely without risking damage to device 108. Another benefit is that secured app 106 may also be managed by the company or other entity that is providing the app to the user, such as an employer providing the app to an employee. For example, if the user leaves the company, the company may automatically delete the app and any related data from the device. In another example, a parent may be able to limit the apps used by another person (e.g., a child) or to limit the amount of time, e.g., 10 minutes a day or limit which Web sites may be accessed by an app. Or, a parent is concerned that an app is leaking a child's location to unknown third parties. There may be numerous other examples. As noted, FIG. 1A is intended to show the general process of securing an app and downloading it onto a device. Note that in this embodiment, app 102 is not made secure from causing harm to the device after it is downloaded onto the device, but before. In another embodiment, the app is secured after it is downloaded onto the device, but before it can interact with the operating system.

Figure 1B:
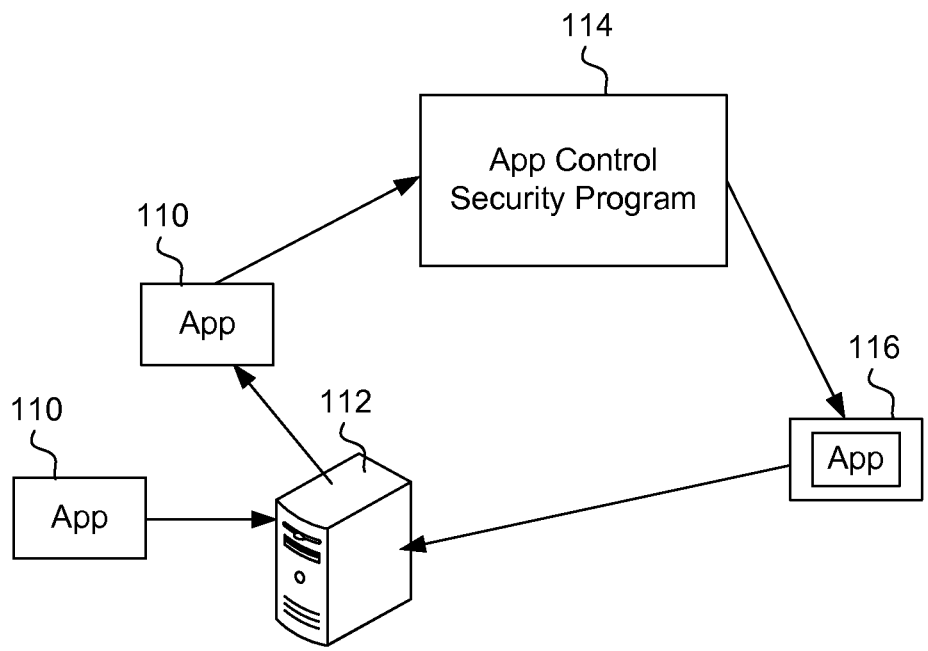
FIG. 1B is a block diagram showing an alternative embodiment of an app control process of the present invention.

FIG. 1B is a block diagram showing an alternative embodiment. An unsecured app 110 (also supplied by an app provider) is downloaded onto mobile device 112. In this embodiment, however, there may be a specially designed app on device 112 that blocks the actual installation of unsecured app 110. The special app (not shown) redirects unsecured app 110 to an app security program 114. The unsecured app 110 is wrapped in a security policy, the resulting app shown as secured app 116. It is then downloaded and allowed to be installed on device 112 by the special app. In this manner, an individual or home user, for example, who wants to protect her phone from security threats posed by apps, can have apps made secure (wrapped) by a third-party service or by her mobile phone carrier, to mention only two examples, before they are downloaded on to her phone. It should be noted that this security wrapping can be done to an app regardless of where the user downloads the app from. It may also be noted that in FIGS. 1A and 1B, the network and connections between the components and software are shown generically. The transmissions are primarily over the Internet (not shown) but may also be within a private network or both.

Figure 2:
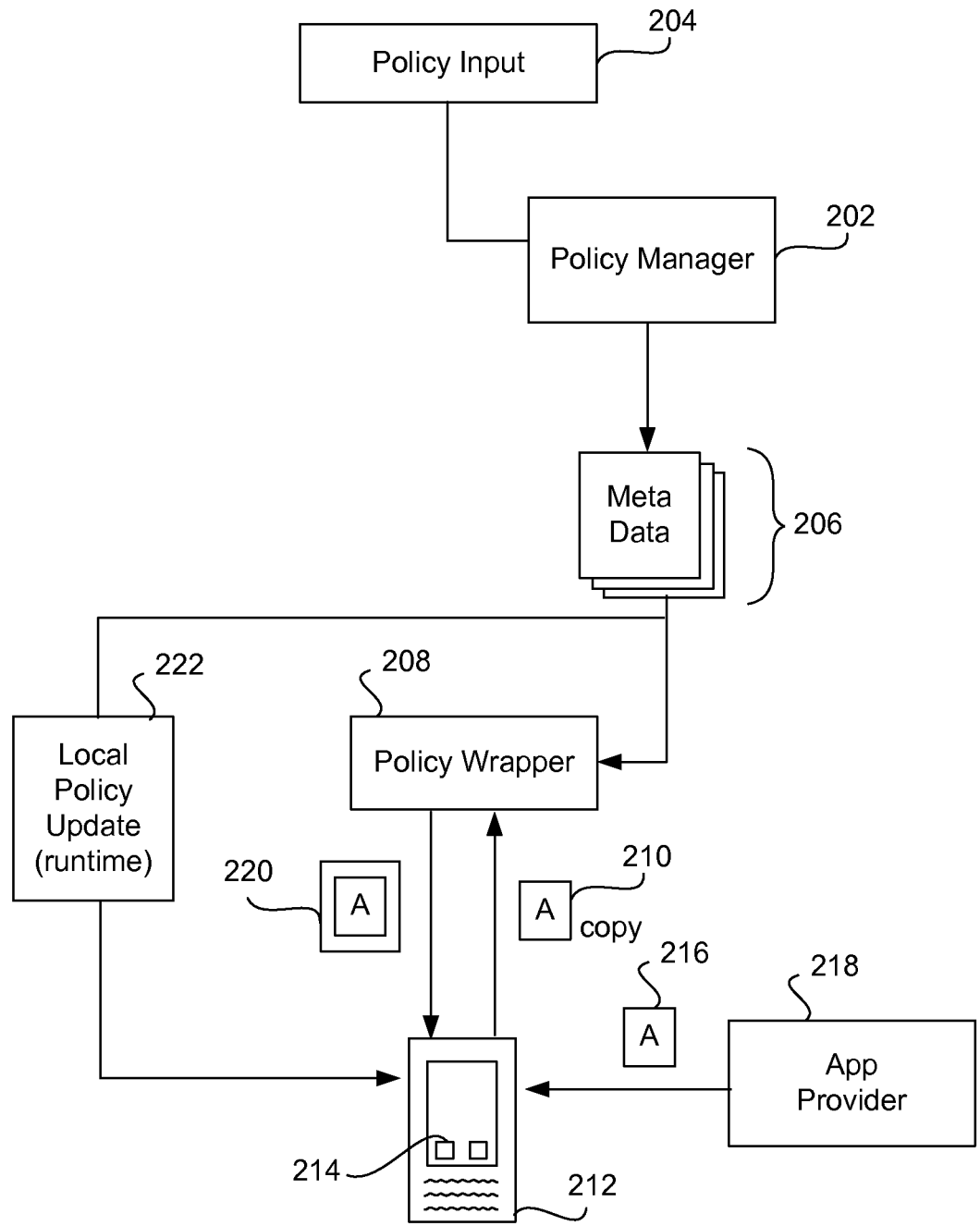
FIG. 2 is a block diagram showing components of an app security program in accordance with one embodiment of the present invention.

FIG. 2 is a block diagram showing components of an app security program in accordance with one embodiment of the present invention. In one embodiment, the security program has two major components, a policy manager and a policy wrapper. A policy manager 202 accepts input from an administrator or other individual who is responsible for setting security for the mobile device. The person may be referred to as the governor since he is governing the security of the one or more mobile devices. The security policy may be set using various user interface screens. There are numerous examples of policies, including geo-fencing (e.g., the app can only be used in a building) and others. The service provider or the entity providing the app security program may also provide default policy and security settings which may be useful for home users. Examples of policy settings are described below. Policy input 204 is inputted into policy manager 202. Policy manager 202 takes the input/settings from the governor and creates policies or meta-data 206. The format or form of meta-data 206 can vary. They essentially reflect the policy settings from the governor.

Metadata (policies) 206 may be used as input to a policy wrapper 208. In one embodiment, this component of the program takes the policies and uses them to secure an app 210 by wrapping it. Wrapper 208 receives an app 210 from a handheld device 212. In one embodiment, wrapper 208 receives a copy of an app 210 instead of the original app 214 that was downloaded onto phone 212 (see FIG. 1B above). Here the handheld device 212 user attempts to download an unsecured app 216 from an app provider 218. In the scenario in described in FIG. 1A, it may operate on the app itself instead of a copy. This may be the case where a market place or app store offers customers a secured version of the app along with an unsecured version (or only offer the secured version). A secured version 220 (security-wrapped version) is returned from policy wrapper 208 to device 212.

Metadata 206 may also be used to update a local policy file (an existing policy that is already on the device). A local policy file is used to update policy parameters residing on device 212. For example, in the case of "geofencing" (i.e., restricting use of an app to an certain physical areas) it is likely that the GPS locations controlled by the governor will change over time. When such a change occurs, the new policies can be applied in two different ways. One is to generate a new policy and apply it to the original app (i.e., wrap the app with the new policy). Another way is to allow dynamic configuration based on a local policy data file with the "variable" part of the policy encrypted/signed inside it. For example, an IT person may want the ability to override a configuration on a device directly through an IT app residing on the device for diagnostic purposes.

In one embodiment policies have two components: a fixed part and a variable part. The fixed part is the content described in the policy file (e.g., "protect the GPS at certain times of day"). The variable part typically is provided by the governor through a console (e.g., "what are the times when the GPS should be protected?"). The variable part can change without applying a new policy.

Policy designers can choose to forego the variable component of the policy and basically "embed" all data or content statically in the policy file. In this case, the console does not have any way to customize the policy.

If the policy designer chooses to include some variable component in the policy, when changes are made to the variable data (on the console), a new data file could be sent to the device to reflect the latest changes. Such a file would be encrypted/signed (to prevent a malicious app circumventing the policy), downloaded to the device, and used by the app security code on the device to apply the new data to the appropriate policy.

Such changes and updates may be done by local policy update component 222 at runtime. This component creates updated policy parameters on device 212. Thereafter, wrapped app 220 will use the updated policy parameters.

In one embodiment, policy manager 202 and policy wrapper 208 are components in the same app security program and may operate on the same computer. In other embodiments, the manager and wrapper components may be on separate computers. For example, the policy manager 202 may be on a server at one site and the policy wrapper 208 may be on a computer at another site and may be managed by a different entity or the same entity. Collectively the manager and wrapper form the app security program which, in one embodiment, is operated by a security service provider. It may also be provided by an enterprise, such as a company, employer, business partner, and the like, or by a mobile phone carrier.

Figure 3:
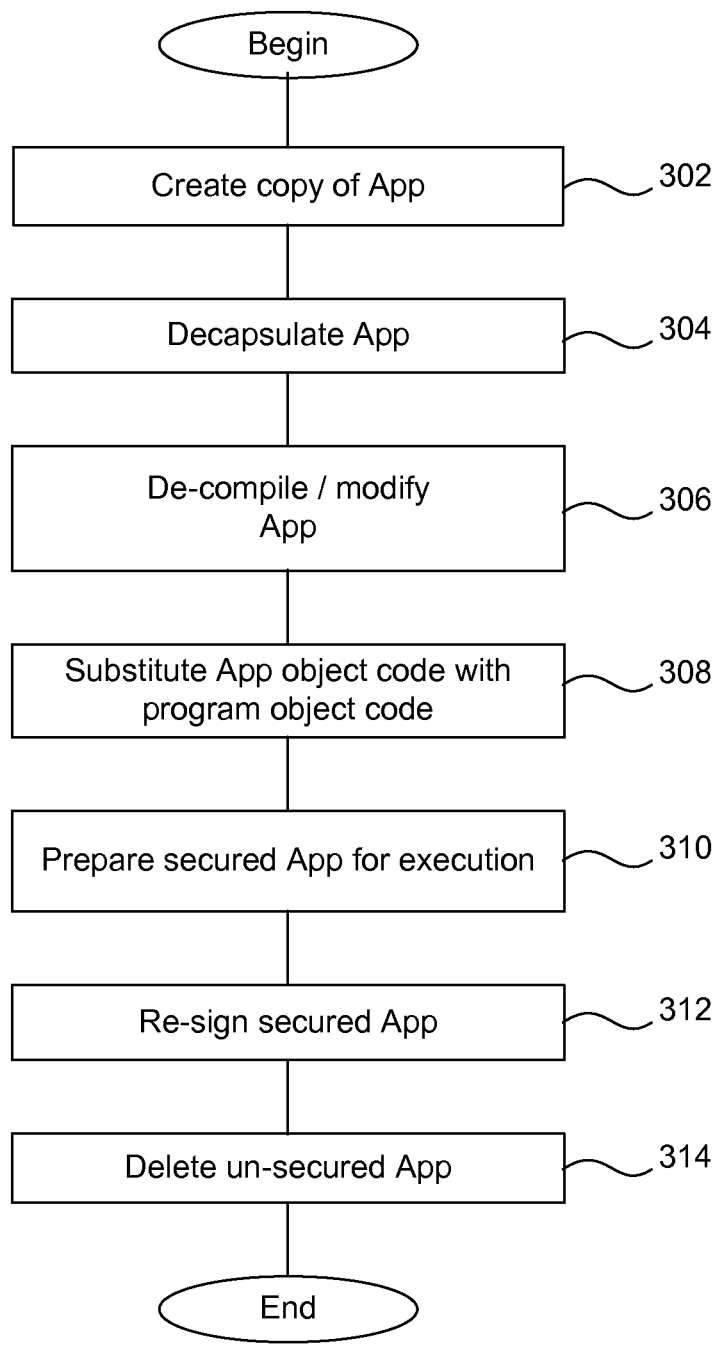
FIG. 3 is a flow diagram showing a process of making an app secure before downloading it on to a device in accordance with one embodiment of the present invention.

FIG. 3 is a flow diagram showing a process of making an app secure before downloading it on to a device in accordance with one embodiment of the present invention. At step 302 a copy or clone of the app that is to be secured is made on the device. In one embodiment, this may be done on the mobile device itself or may be done off the device, for example, on components on the Internet, in the cloud, on an enterprise's server or on a carrier server. The user may be an individual, an employee of a company or other entity. As is known in the field, an app may be obtained in a number of ways, most typically from an app store or an app market, or directly from the app developer or provider or in any suitable manner. By making a copy, the original app is preserved giving the user an option to use either the secured or unsecured version and also protects the user's ability to use the app if something goes wrong with the app control process. Note that in one embodiment, the app is not yet downloaded on to the phone. In one embodiment, the methods described below are performed on separate computing devices. In another embodiment, the process may be performed on a mobile device, but the app is only executed on the device after the process is complete and the app has been made secure.

At step 304 the app is decapsulated. Most, if not all, apps have digital signatures signed by the author/developer. At step 304, as part of the decapsulation, the digital signature is removed from the app. This may be done using techniques known in the art. Decrypting the app may also be performed at this step. These and other steps provide the core object code of the app which may now be operated on by the app control program. The nature and specifics of this operation may depend on the mobile device's operating system.

There are several examples of operating systems for smart phones such as iOS (for the iPhone), Android (used on handsets from various manufacturers), Windows Mobile 7, Web O/S, Palm, and others. At step 306, the core object code app may be either disassembled or decompiled to obtain the executable object code. For example, it can be either "native code" (CPU instructions) or bytecode (virtual machine instructions, such as Java or .Net). In one embodiment, this may be more of a modification process if the device runs iOS where the disassembly is closer to a process of locating and substituting certain links and terms. However, in general, the disassembly process to obtain the object code of an app after it has been decapsulated may be done using techniques known in the art, such as using disassemblers.

At step 308 the app object code is augmented with object code from the app security program. For example, this object code may include class files which are replaced with class files from the security program. The object code generally provides an interface to the mobile device operating system. The app control security program object code is derived, in part, from the policy/meta-data described above. In the case of iOS, the operation is different in that a 'locate and substitute' process occurs rather than an object code replacement. This takes into consideration an interrupt approach that iOS's uses. Generally, the app security program goes through the assembly language code. The specific items located are Software Interrupts (SWIs) within the object code and which are replaced with a branch to an app control security program layer which may then determine what further actions to take, such as making the request, enhancing the results, and others, as described below.

At step 310, after substitution of the object code (or substitutions of SWIs) has been made, the app security program prepares the security wrapped app for execution on the mobile device. The object code substituted into the app by the security program generally provides a bridge or connection between the app and the mobile device operating system. The security program class files may be described as wrapping around the operating system class files. The app security program class files are generated based on the policies created earlier (by input from the governor). The app is essentially re-wired for execution on the handset. It is re-wired to use the app security program layer in addition to the security provided by the mobile device operating system layer. That is, the secured app may still be subject to the security provisions of the operating system. In one embodiment, certain cosmetic changes may also be made to the app, such as changing the icon for the app to reflect that it is secured. By doing this, the user can be sure that when the app icon appears on the handset screen that the secured version of the app will be executed. The app has now essentially been re-factored or re-programmed by the security program.

At step 312 the app is signed with a new key, for example, with the key of the service provider or the key of the enterprise providing the secured app. The re-factored, secured version of the app is returned to the handset device. In another embodiment, the app is wrapped with the security layer on the phone. At step 314, in one embodiment, the original, unsecured copy of the app is deleted from the handset device. This may be done by the secured version of the app once it is downloaded onto the handset. In other embodiments, this is not done and both versions remain on the mobile device. At this stage the process is complete.

Figure 4:
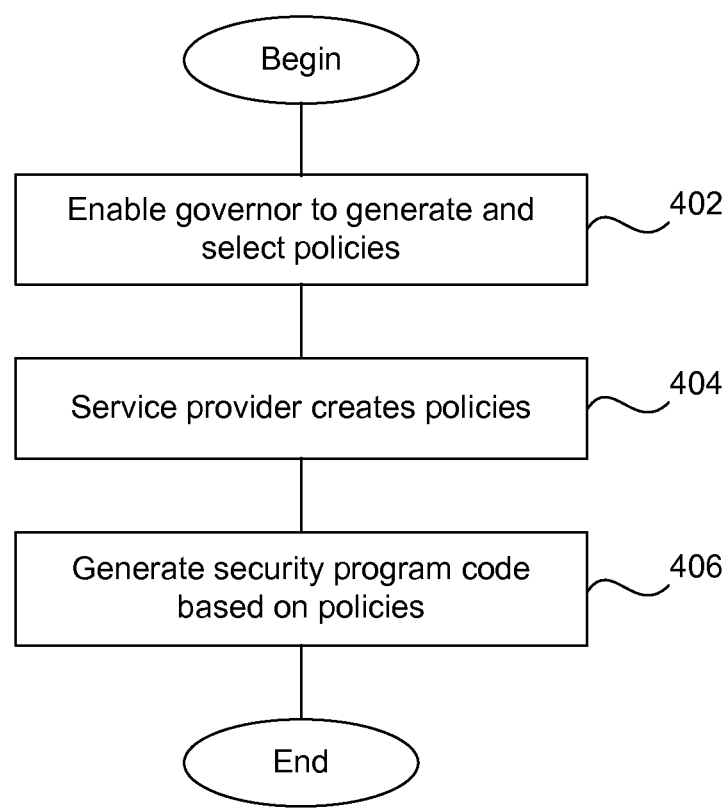
FIG. 4 is a flow diagram of a method performed in policy manager in accordance with one embodiment.

FIG. 4 is a flow diagram of a method performed in policy manager 202 in accordance with one embodiment. At step 402 the governor or other security policy individual is enabled to define, generate, and create security policies. This may be a network administrator for an enterprise deciding a vast array of mobile device security policies for hundreds of employees using dozens of enterprise apps (specifically for work) that may be downloaded on hundreds or thousands of mobile devices. On the other end of the spectrum, it may be a parent who is setting security policy for three or four apps downloaded by her child on a new mobile device. Other examples include preventing or squashing a gaming app using GPS, preventing an app from using a microphone on the device to record or eavesdrop on a conversation, among many others. In either case, the governor may take into consideration the category of the app, the type and nature of app, the author, the age-appropriateness, and numerous other factors. For example, has the same author written any other apps that may have been classified as malware or posed a security threat to the device. It may determine whether there are other apps by the same author. It is at this stage that the governor decides which rules to apply for each app. In one embodiment, this is done off-line by the governor. That is, it may be done using user interfaces on a home computer or on an enterprise network computer used by an administrator where security templates provided by the security program service provider (essentially default templates) may be used or very specific rules may be set using the templates.

At step 404 the security data input at step 402 is used by the app control security program to create the actual policies. At step 406 the app control security program object code is generated based on the input from the governor regarding security policies created at step 404. The governor or service provider may also update existing security policies if needed. As described above, the object code may be used to enhance certain original object code obtained from the disassembled app. The enhancement code is inserted to adjust security and privacy settings for an app in order to protect the enterprise and end user. The original app's behavior is altered which allows the governor to control how the app behaves. For example, if an app stores sensitive account information in the clear (i.e., un-encrypted), the behavior could be changed so that all information the app creates is stored in encrypted form and which can only be accessed by that app given that the key to the stored, persistent data would be unique to the app. In many instances the enhancement code can improve the apps performance since the code is optimized for a particular use scenario.

Figure 5:
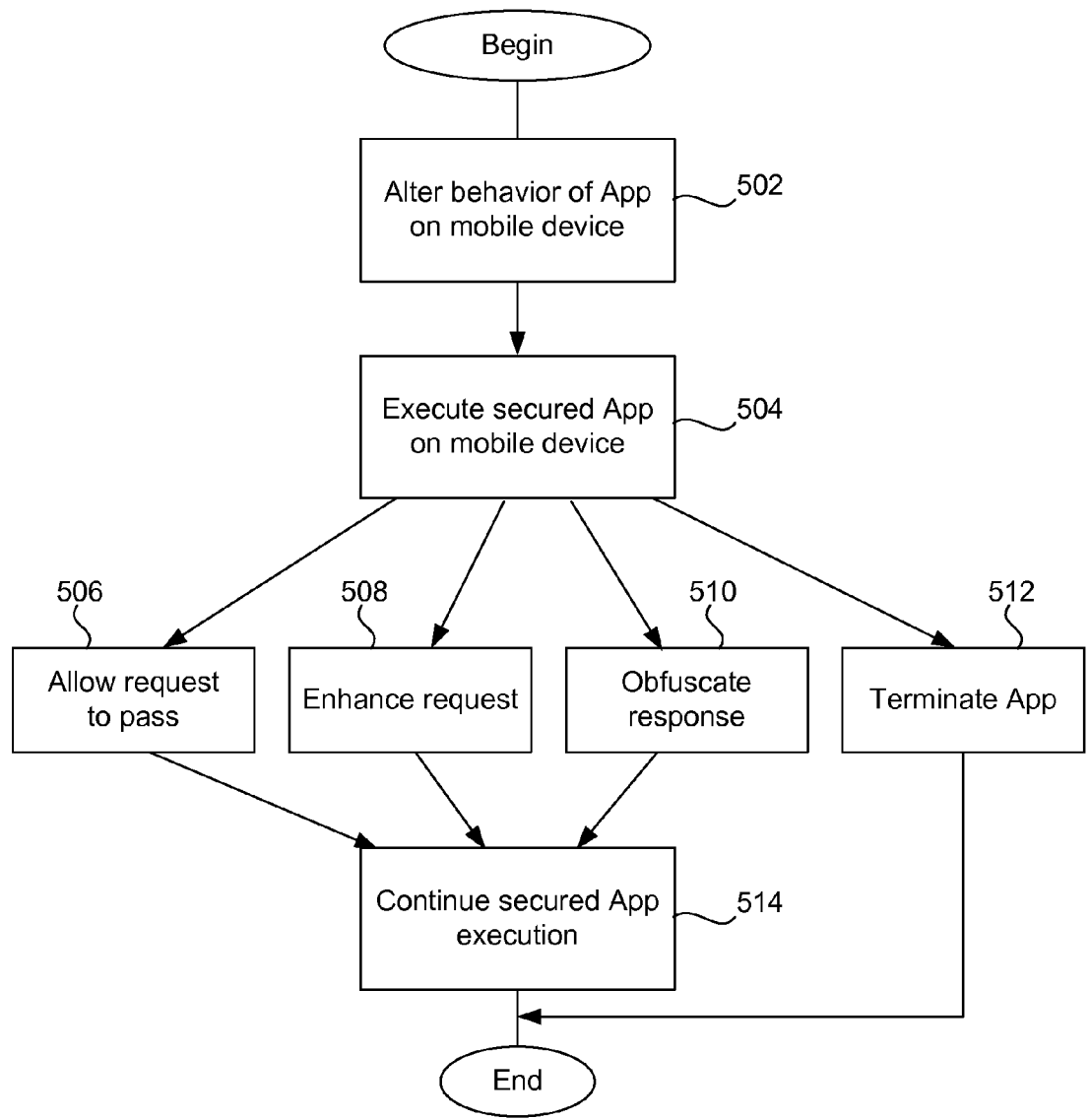
FIG. 5 is a flow diagram showing a process of a security-wrapped app executing on a handset or mobile device in accordance with one embodiment.

FIG. 5 is a flow diagram showing a process of a security-wrapped app executing on a handset or mobile device in accordance with one embodiment. At step 502 the behavior of the app when the app executes or immediately before it executes on the device is altered or modified. For example, behavior modification may include authentication during app initialization; e.g., smart/CAC card, or password challenge. Some apps, as originally designed, may not require a password for security, however, a secured version of an app which has been modified may require that the user enter a password. At step 504 the secured app executes on the mobile device by the user activating it (e.g., tapping on the icon if the device has a touch screen). Upon execution of the app, in one embodiment, control can take one of four options. As is known in the art, when an app executes, it makes calls or requests to the device operating system in order to carry out its functions. In many cases these calls may be harmless or pose no significant security threat to the phone or device. If this is the case, the call may be allowed to pass to the operating system as shown in step 506. Here the call is made to the device operating system and the app executes in a normal manner.

If the security layer or wrapper around the app detects that the app is making a request that may pose a security threat to the device, the app security layer may enhance or modify the request before it is passed to the operating system or other software or hardware component in the phone. This is shown at step 508. In one embodiment, the governor determines which calls are permissible by examining the one or more policies. For example, the governor may determine that all data should be saved in encrypted form. In another example, the governor may decide that only a select group of trusted apps should have data on a soldier's GPS coordinate. In one embodiment, there is no runtime logic to determine what is safe, a potential threat, or an actual threat; it is essentially pre-declared by the governor in the policy created at step 404 above. In another embodiment, there may be some runtime logic. For example, an app may be trying to send out expensive SMS text messages. The app control program may determine this and block the app from sending more than a certain number of text messages, for example, it may limit it to transmission of one message. The enhancement may be adding something new, such as a password requirement. In another example, if the call is to save data on the mobile device memory, the secured app may actually back up the data to a storage area in the cloud or on the Internet (i.e., off the device). In another example, the data related to the call may be encrypted.

At step 510 the secured app may determine that the call is an actual threat and should be dealt with in a more severe manner than at step 508. For example, it may have decided that based on the policy for an app, that if a camera on the device is accessed while in a secure building (e.g., the Pentagon), the app should immediately be terminated. Merely enhancing the request may not be sufficient in this case. At step 510, the request may not be allowed to proceed to the operating system or any other component of the device. However, in one embodiment, a response is returned to the app, but that response is intentionally not accurate or correct. It is essentially an obfuscated response. For example, it may be a GPS coordinate that is not the actual physical coordinate of the device (e.g., the device is in California, but the GPS coordinate that is returned to the app is a coordinate in Nebraska). This may be desirable when apps are used by children. Other examples may be returning bad or garbled data results if an app that should only run within a restrictive environment (e.g., a secure office area) is determined to be running outside that environment (e.g., at home). In this example, the app may be partially crippled so that the app can only access unclassified data and wherein classified information is nullified. In another example, when a user is attempting to paste or copy sensitive data from a classified app to a non-classified app, the app control program may change the copy of the data that is being pasted to garbage or essentially make it meaningless. After either steps 506, 508, or 510 have completed, the security-wrapped app continues execution on the mobile device at step 514.

At step 512 the security layer around the app has determined that the call being made by the app or that the app execution behavior in general poses too high a security threat level to the mobile device. In this extreme case, the security layer decides to terminate execution of the app and/or delete the app. For example, the app may be using too many resources on the phone, such as bandwidth, or is making too many high-risk calls to the operating system thereby over-exposing the mobile device. In this case, the app can simply be deleted from the phone or the app may be terminated. The user may not be able to re-execute it or re-install it. For example, an employee may not install that app again on the company phone because it was exposing sensitive company data. Or it may be determined that an app is secretly collecting data on the phone or installing malware.

Figure 6:
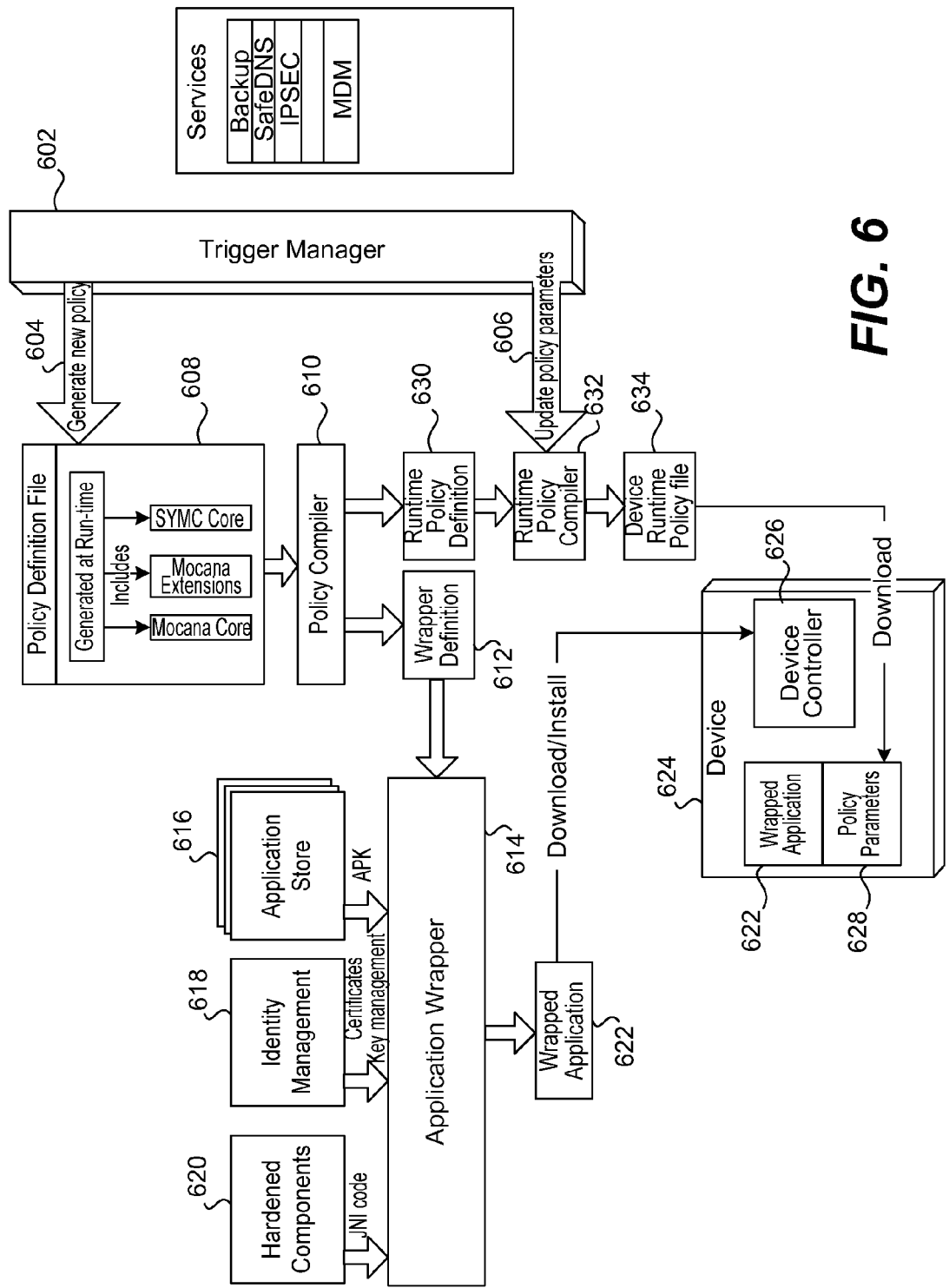
FIG. 6 is a system architecture diagram of the app security control system in accordance with one embodiment.

FIG. 6 is a system architecture diagram of the app security control system in accordance with one embodiment. A trigger manager component 602 handles two events, one for generating a new policy 604 and another for updating policy parameters 606. Such events can be triggered by various systems. For example, a console administrator or governor might apply a new policy to all devices (a manual operation). Or a network monitoring application, after detecting suspicious traffic originating from a device (or app), could push a new policy that would prevent a user/device/app from accessing network resources (an example of an automated operation). The various systems or entities that have the authority to change/update polices, do so through the trigger manager 602.

New policy output 604 is input to a policy definition file 608 which may be generated at runtime and may include various types of code and extensions, for example, specific to the app control service provider, or to the app/user/device the policy applies to. Policy definition file 608 is input to a policy compiler 610 which has two outputs. One output is a wrapper definition file 612. This file is input to an app wrapper component 614. App wrapper component 614 is responsible for generating secure app by injecting custom binary code (native or bytecode) into an app, downloaded directly, for example, from an app store. Or the app could be an app the user downloaded on to his device, and then uploaded to an "App-Control" server.

App wrapper component 614 may have three inputs: apps from one or more app stores 616, certificate key management data from identity management component 618, and hardened components 620. Key management data is used to tie the identities of the user, device, and the app, and ensure that any operation subject to policy control can be tied to a specific user/device/app. This also ensures that a wrapped application can only be run on a specific device to prevent a malicious app from circumventing policies and hardened components 620 (for example "Device security framework"). The output from app wrapper 614 is a wrapped app 622 which is downloaded or installed onto mobile device 624 via the device's controller 626. Device controller 626 responsibilities include: download app from the app wrapper; ensure that app running on the devices are appropriately wrapped apps (e.g., app wrapped for user1 should not be installed/run on device for user2); report list/version of installed applications to allow the management console to control policies for each device/user/application; and download policy parameters when appropriate. Wrapped app 622 resides on device 624 coupled with policy parameters 628.

Returning now to policy compiler 610, the other output is a runtime policy definition file 630. This file is input to a runtime policy compiler 632 which also accepts as input policy parameters 606 (specified by the management console, or other subsystems). Output from compiler 632 is a device runtime policy file 634. This file 634 is downloaded onto device 624 as shown as policy parameters 628, and is used to customize the policies applied to wrapped app 622.

Described below are various use cases and capabilities of the app control security program of the present invention. One use case involves the separation of work life and personal life on a mobile phone. There are apps for the user's personal use and apps that the user's employer (or a business partner of the employer) may have provided and the apps operate on the same phone, which is often the user's personal phone. The governor who determines security of the apps that need to be secured on the user's phone may block copy/paste operations between apps (such as e-mail apps). The governor may set policies for the work-related apps that perform selective wipes of apps and associated files. User location-based policies may also control where certain apps may execute. Examples of levels of protection because of malware are denying access to contacts, denying transmission of SMS without consent, and the like.

Another example of a use case is app control. Using the present invention, white and black listing of apps may be implemented, as well as full deletion of apps according to the policies set by a governor. An app may be 'sandboxed' to protect the other apps, software, and hardware of the device. Other capabilities may include identity-based control of apps or services and highly granular control over app behavior. Trojan identification is another use case that can be implemented with the app security program. For example, each app and content may be encrypted to prevent rogue apps from gaining access to and stealing confidential data on the phone. The security program may also be able to identify anomalous system call behavior of an app to identify malicious Trojan apps that act outside of their published intent.

Another use case is back-up and recovery of app data in which IT security administrators and governors have data revision control and can implement app and device content migration through back-up and restore operations. In another use case is network traffic monitoring. The app on the mobile device may be brought under the visibility of existing enterprise IDS/IPS/Web filtering infrastructure to allow for inspection and control of app communications. The app security program can also integrate with third-party DNS services, such as Symantec's DNS service to identify malware. All app communications may be encrypted, including communications at the mobile phone service provider. Other use cases include session continuity, consumer privacy (e.g., GPS obfuscation, implementing safe DNSs), and intercepting payment/transaction messages from the mobile device (i.e., operating in the middle of mobile commerce streams).

In one embodiment, the app security service is offered by a third-party service provider, for example, to make apps used by end-users or individuals (i.e., users not associated with an employer or enterprise). For example, a parent may want to obfuscate the GPS of a child's phone because the parent does not want a social network site, such as Facebook, to know where the child is, essentially disabling GPS. In another embodiment, an app store, operated by a wireless phone carrier (e.g., Verizon, AT&T) may offer a secured app for an extra charge or premium. A customer of the carrier can download the secured app from the marketplace or online store instead of the unsecured version by paying an extra amount. In another embodiment, an enterprise may have its own app store for its employees, partners, and the like, where users can only download secured versions of the apps (which may be referred to as "hard" apps). These apps may have many of the security features described above as defined by a governor (security administrator) at the enterprise, such as blocking copying and pasting e-mail or corporate data, killing an app from the user's phone if the user leaves the company, and so on. A mobile phone carrier's DNS can typically access any site, but the app security program can block a mobile device browser so that it can access only a safe DNS (e.g., Symantec's DNS) from where only safe Web sites may be accessed. In another embodiment, the app security program provider can work with the mobile device manufacturer to incorporate the app security program or functionality into the hardware and software operations of the device. In this embodiment, described below, a user can download an unsecured app and make is secured on the phone or device itself before executing and does not have to access a third-party service to have the app secured or ensure that the app is secured before being downloaded onto the device.

As can be seen from various embodiments described above, the security of the mobile device extends beyond the device itself and is applied directly to the apps that are downloaded onto the device. Companies and other entities are able to take advantage of apps more freely without having to worry about the security risks, such as data leakage or malware infection of the company's enterprise IT system. Companies can maintain governance of its corporate data.

In another aspect of device security and app execution, a user downloads an unsecured app and has it execute with a policy enforced by an engine pre-deployed on the device. In this manner the app is essentially secured on the device (using a policy on the device) after which the security-enforced app can execute. In this aspect of device security and app execution, a third-party app security provider may integrate or pre-deploy its services with existing services (e.g., firmware) offered by the device manufacturer. As such, this embodiment may be referred to as a pre-deployment embodiment. That is, the provider and the device manufacturer work together so that the device (made by the manufacturer) contains software and/or firmware that interacts or communicates with the device operating system and is integrated in the device. In this embodiment, the device manufacturer can inform (e.g., advertise to) potential customers that its device, such as a smart phone, is more secure with respect to app execution than a competitor's device. The customer still downloads apps in a familiar or conventional manner, where the apps are likely to be unsecured (i.e., unwrapped), and when the app executes on the device, it is essentially secured and is significantly less likely to cause damage to the device.

In reference to components and modules from the embodiments described above (i.e., post-deployment embodiments), this aspect of the invention utilizes what may be described as the equivalent of policy manager 202. That is, the functions of policy manager 202 are implemented in the pre-deployment embodiment using other modules and techniques. In one embodiment, policy wrapper 208 described above may not be needed on the device because the security enforcement is done via interpreting or compiling a policy by an enforcement layer. In some devices, such as mobile devices, there is often a Type 2 hypervisor or app "sandbox" operating above the operating system software. This conventional hypervisor or sandbox either allows an app to execute or does not; it provides a somewhat limited binary functionality with respect to app security. In certain aspects of the present invention, described below, another type of hypervisor operates on top of the conventional Type 2 hypervisor, where logic enabling more than mere 'allow or do-not-allow' type functionality is performed.

Normally apps operate by interacting within a sandbox layer above the operating system of the device. This is to ensure that the apps do not interfere with each other during execution. In iOS, the apps utilize shared object files and execution goes through an SWI instruction. The sandbox is part of the iOS operating system.

Figure 7:
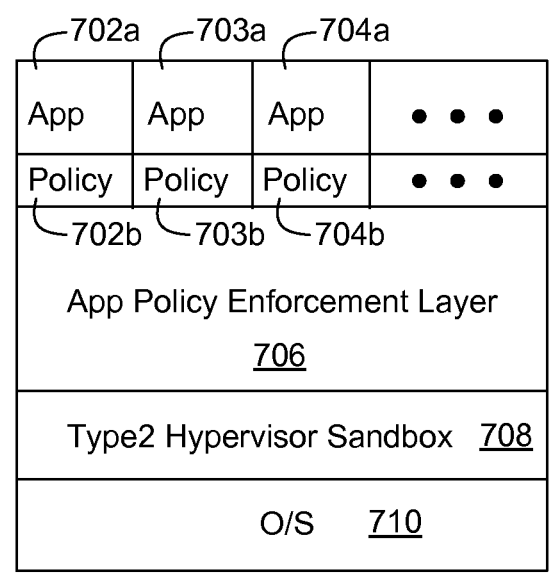
FIG. 7 is a block diagram of components for securing an app on a device during execution in accordance with one embodiment.

As is known in the art, one or more apps may execute in the sandbox (or similar virtual environment) on the device at any given time. In one embodiment of the present invention, an app policy enforcement layer or engine is implemented between the apps and the sandbox. FIG. 7 is a block diagram showing a structure for apps security on a device in accordance with one embodiment of the present invention. This structure has modules and components that reside on the device, e.g., a smart phone, tablet, or TV. Shown are several apps, where each box 702*a*, 704*a*, 706*a* . . . represents the software for each app residing on the device's internal memory (not shown). Attached to each app is a policy 702*b*, 704*b*, 706*b* . . . . As noted above, some apps may not have a policy. However, in most cases, policy manager 202 has performed its functions, that is, creating and managing policies for the user's apps. Since the policies are on the device (or they are downloaded onto the device with the app), the policy manager's functions are done. The policies for each app, or generic policies for the user, are already on the device. However, as described below, there is a process to ensure that the app has an associated policy before it is allowed to execute or perform system calls. App policy enforcement layer 706 contains logic to determine what should be done each time a system call is made by an app. When an app is downloaded onto the device by the user, the app does not have to be previously wrapped or secured; it may be unwrapped, as a vast majority currently are. It is also possible that a secured or wrapped app may be downloaded and the same concepts and methods described below can apply.

As noted, app policy enforcement layer 706 is a software engine that resides on the device, but may be supplied and created by an app control service provider and integrated onto the device by the device manufacturer. The logic performed by layer 706 is described in FIG. 8. Operating under layer 706 is a conventional Type 2 sandbox 708 and the operating system software 710.

Enforcement layer 706 determines how an app should behave when it executes. It examines the policies to determine what actions should be taken when it executes. Enforcement layer 706 may not have any knowledge of how an app should behave with respect to security of the device. That is, layer 706 does not know what the app is allowed or permitted to do on the device. In one embodiment, the only way it can know is by examining the policy associated with the app. In one embodiment, layer 706 interprets the policy, comprised of computer code, when the app makes a system call or request. Upon this interpretation, layer 706 determines how the app may execute or behave on the device. In one embodiment, after the policy has been interpreted by layer or engine 706, one of four actions can be taken. These four actions are the same as those described above. They are shown again in FIG. 8 in the context of security wrapping an app on the device (pre-deployment embodiment).

Figure 8:
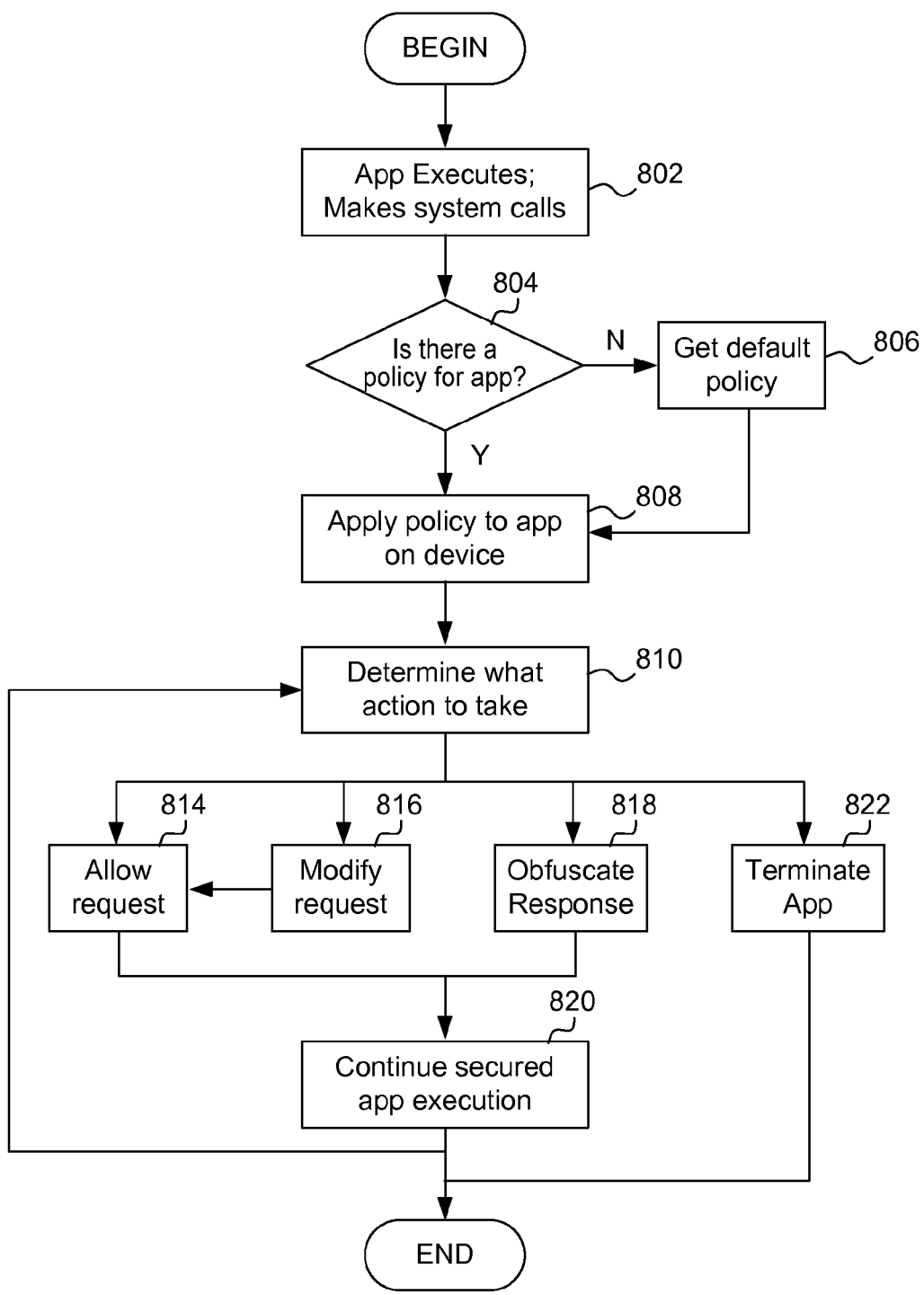
FIG. 8 is a flow diagram of a process of securing an app on a device during execution of the app using integrated functionality of the device in accordance with one embodiment.

FIG. 8 is a flow diagram of a process of applying a security policy to an app before execution on a device in accordance with one embodiment. At step 802 an app that is already executing makes a system call to the device operating system. In one embodiment, the steps of applying the policy and determining what security actions to take occur only after the app makes an actual call to the device operating system. At step 804 enforcement layer 706 checks whether there is a policy for the app that is executing. This may be done with assistance from the policy manager. An example of a policy is provided below. If there is no policy for the app, a default policy for the app or user is obtained from device memory. A default policy is set by the user or the device manufacturer.

If there is a policy, control goes to step 808 where the policy is applied to the app on the device. In the described embodiment, the policy is interpreted by engine 706. Once applied, enforcement engine 706 knows how the app can behave, that is, it knows what it can allow the app to do. In another embodiment, enforcement layer 706 may compile the policy instead of interpreting it. For example, it may perform a 'just-in-time' compile operation, generating code on the spot, for the app where the code is unique for the app. As is known in the art, JIT compiling is generally more efficient than interpreting, and typically can be done only if allowed by the operating system. Typically, dynamic loading of code is allowed only to privileged operating system components. In another embodiment, sandbox 710 (Type 2 hypervisor) can also be protected by collapsing sandbox 708 into operating system 710.

After step 808, enforcement layer 706 applies its logic and determines what action to take with respect to app behavior or what action the app can take at step 810. The call may be no threat to the device and may be allowed to simply pass to the operating system as shown in step 814. From there control goes to step 820 where the app continues execution using policy enforcement layer 706. If enforcement layer 706 detects that the app is making a request that may pose a security threat to the device, enforcement layer may enhance or modify the actual request before it is passed to the operating system or other software or hardware component in the phone as shown in step 816. After the request is modified, it is allowed to pass to the operating system and control goes to step 814 (and then to step 820). The enforcement layer 706 may determine that the call by the app is an actual threat and should be dealt with in a more severe manner than at step 816. For example, the request may not be allowed to be sent to the operating system or any other component of the device. However, in one embodiment, even though the request may be blocked, a response is still returned to the app, but that response is intentionally not accurate or correct as shown in step 818. It is an obfuscated or deliberately misleading response. If enforcement layer 706 has determined that the call being made by the app, or that the app execution behavior in general, poses too high a security risk to the device, the app is terminated or deleted at step 822 by enforcement layer 706. The process ends after step 822 (i.e., control does not go to step 820). Control then goes to step 820. From step 820 control goes back to step 810 where enforcement layer 706 determines what action to take.

This embodiment may be referred to as a container approach, in that a container wraps around the app. Here the container is part of sandbox 708. In other systems presently in use, there is essentially a big container and all apps must be written and must execute in the single container (e.g., Good Tech). In order to execute out of the container, the app must leave the container. In the described embodiment of the present invention, two different apps, one secured and the other unsecured, can run in enforcement layer 706 at the same time.

As noted, when an app is downloaded, one or more policies may be downloaded with the app. A call or request is made to a policy manager to look up policy data needed for that particular app. In the described embodiment, the app is not modified.

As is evident in the various embodiments, a pre-deployment scenario and the other embodiments, app policies are a key element in ensuring the security of the device. An example of a policy may be that if two apps are from the same author and, therefore, have the same private key, and both apps attempt to execute at the same time, certain actions may be taken, such as preventing the two apps from communicating with each other or sharing information. One app may be a contact manager and the other may be an SMS texting app. Because they have the same signature, the two apps can essentially "see" each other and collude. It is possible that two or more apps from the same author that are executing at the same time can share data and cause harm to the device, even though each app may be benign if executed separately. The policy may prevent apps signed with the same private key from exchanging data in sandbox 708, which operates below enforcement layer 706. In this respect, the described embodiment of the present invention is improving operations of sandbox 708. For example, the present invention may eliminate or reduce the need for binary operations, such as blacklisting and whitelisting of apps, and the like.

Figure 9A:
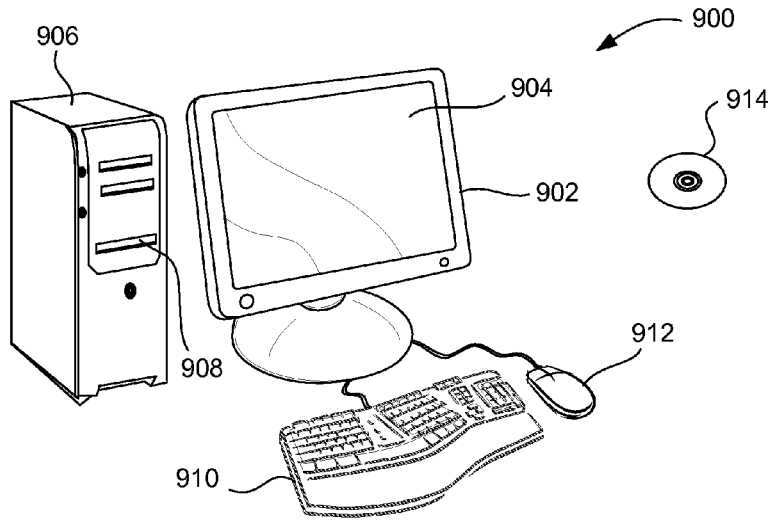
FIGS. 9A and 9B are block diagrams of a computing system suitable for implementing various embodiments of the present invention.
Figure 9B:
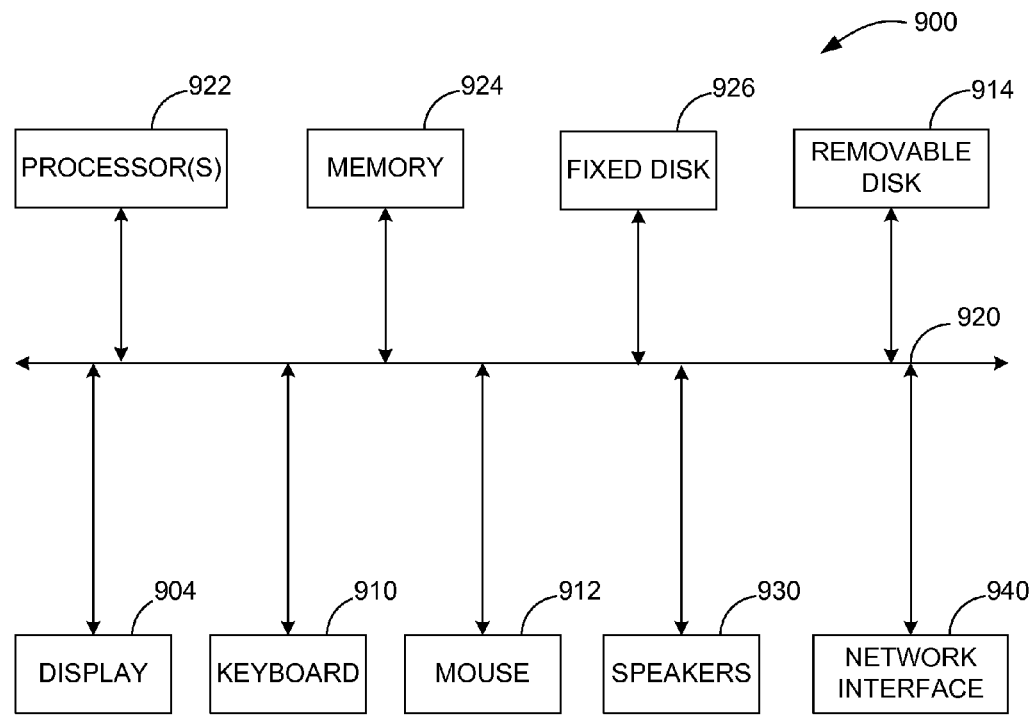

FIGS. 9A and 9B illustrate a computing system 900 suitable for implementing embodiments of the present invention. FIG. 9A shows one possible physical form of the computing system. Of course, the computing system may have many physical forms including an integrated circuit, a printed circuit board, a small handheld device (such as a mobile telephone, handset or PDA), a personal computer or a super computer. Computing system 900 includes a monitor 902, a display 904, a housing 906, a disk drive 908, a keyboard 910 and a mouse 912. Disk 914 is a computer-readable medium used to transfer data to and from computer system 900.

FIG. 9B is an example of a block diagram for computing system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are to be considered as illustrative and not restrictive, and the invention is not to be limited to the details given herein, but may be modified within the scope and equivalents of the appended claims.

We claim:

1. A method of securing an unsecured app for execution on a device having an operating system, the method comprising:
    executing the unsecured app on the device;
    determining whether there is an app security policy on the device for the unsecured app;
    disassembling app object code of the unsecured app, thereby obtaining executable object code which includes class files;
    generating class files for an app security program based on the app security policy;
    replacing the class files of the unsecured app with the generated class files of the app security program, wherein operating system class files of the unsecured app are wrapped with the generated class files of the app security program such that the unsecured app becomes a secure app and thereby provides a bridge between the secure app and the device operating system;
    performing a security check on a call made by the secure app to the operating system, said security check made in an app enforcement layer operating above a hypervisor in the device; and
    based on said security check and said app security policy, performing one of
    (a) allowing the call to pass to the operating system;
    (b) enhancing the call;
    (c) blocking the call; and
    (d) terminating the secure app.

2. The method as recited in claim 1 wherein terminating the secure app further comprises: automatically deleting the secure app from the device.

3. The method as recited in claim 1 wherein the app security policy may include one or more of limiting app execution time on the device, limiting the total number of apps on the device; limiting geographical physical area where the secure app may execute; and preventing two apps by the same author or creator from executing at the same time.

4. The method as recited in claim 1 wherein the secure app has one or more associated policies.

5. The method as recited in claim 1 further comprising: obtaining a default policy from the secure app.

6. The method as recited in claim 1 further comprising: ensuring that the unsecured app has an associated policy before the secure app executes.

7. The method as recited in claim 1 wherein the app enforcement layer on the device is created by an app security service provider for implementation on the device.

8. The method as recited in claim 7 wherein the app enforcement layer has no knowledge of privileges relating to the secure app.

9. The method as recited in claim 1 further comprising: interpreting the app security policy on the device.

10. The method as recited in claim 1 further comprising: compiling the app security policy on the device.

11. The method as recited in claim 1 wherein the secure app and one or more other unsecured apps can execute at the same time.

12. The method as recited in claim 1 wherein execution of the secure app continues after enhancing the call and after blocking the call.

13. The method as recited in claim 1 wherein blocking the call further comprising: performing one of providing an obfuscated response to the call and providing partial data in response to the call such that any classified data is kept confidential.

14. A mobile device for executing an unsecured app, the device having an operating system comprising:
    means for executing the unsecured app on the device;
    means for determining whether there is an app security policy on the device for the unsecured app;
    means for disassembling app object code of the unsecured app, thereby obtaining executable object code which includes class files;
    means for generating class files for an app security program based on the app security policy;
    means for replacing the class files of the unsecured app with the generated class files of the app security program, wherein operating system class files of the unsecured app are wrapped with the generated class files of the app security program such that the unsecured app becomes a secure app and thereby provides a bridge between the secure app and the device operating system;
    means for performing a security check on a call made by the secure app to the operating system, said security check including:
    (a) allowing the call to pass to the operating system;
    (b) enhancing the call;
    (c) blocking the call; and
    (d) terminating the secure app.

15. The mobile device as recited in claim 14 further comprising: means for providing an obfuscated response to the call and means for providing partial data in response to the call such that any classified data is kept confidential.

* * * * *